(12) United States Patent
Takechi

(10) Patent No.: US 9,901,084 B2
(45) Date of Patent: *Feb. 27, 2018

(54) DUAL-BEARING REEL

(71) Applicant: Shimano Inc., Sakai, Osaka (JP)

(72) Inventor: Kunio Takechi, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/410,171

(22) Filed: Jan. 19, 2017

(65) Prior Publication Data

US 2017/0245484 A1    Aug. 31, 2017

(30) Foreign Application Priority Data

Feb. 26, 2016 (JP) .................................. 2016-036391

(51) Int. Cl.
  *A01K 89/0155*  (2006.01)
  *A01K 89/015*   (2006.01)
  *A01K 89/033*   (2006.01)
  *F16D 41/066*   (2006.01)

(52) U.S. Cl.
  CPC .... *A01K 89/01557* (2015.05); *A01K 89/0188* (2015.05); *A01K 89/01931* (2015.05); *A01K 89/033* (2013.01); *F16D 41/066* (2013.01)

(58) Field of Classification Search
  CPC .. A01K 89/0155; A01K 89/02; A01K 89/029; A01K 89/057; A01K 89/058; A01K 89/059
  See application file for complete search history.

(56) References Cited

U.S. PATENT DOCUMENTS

| | | | | |
|---|---|---|---|---|
| 5,746,381 A | * | 5/1998 | Miyazaki | A01K 89/015 192/69.63 |
| 5,875,986 A | * | 3/1999 | Miyazaki | A01K 89/015 242/261 |
| 5,988,547 A | * | 11/1999 | Koelewyn | A01K 89/02 242/246 |
| 6,053,444 A | * | 4/2000 | Yamaguchi | A01K 89/015 242/275 |
| 2001/0038052 A1 | * | 11/2001 | Oishi | A01K 89/0117 242/255 |
| 2002/0017441 A1 | * | 2/2002 | Kemp, III | F16D 41/08 192/45.008 |
| 2005/0162976 A1 | * | 7/2005 | Kuriyama | A01K 89/00 367/111 |

(Continued)

FOREIGN PATENT DOCUMENTS

EP  3005870 A1 * 4/2016 ............. A01K 89/05
JP  9-275861 A    10/1997

*Primary Examiner* — Emmanuel M Marcelo
(74) *Attorney, Agent, or Firm* — Global IP Counselors, LLP

(57) ABSTRACT

A dual-bearing reel includes a reel body, a spool rotatable relative to the reel body, a spool shaft integrally rotatable with the spool, a one-way clutch and an operating lever. The one-way clutch includes an outer ring rotatable relative to the reel body and a rolling body configured to transmit rotation of the spool shaft in a casting direction to the outer ring. The one-way clutch is attached to the spool shaft. The operating lever has a flat shape, is attached to the reel body, and extends in a radial direction. The operating lever is configured to adjust a braking force that brakes the rotation of the outer ring.

15 Claims, 12 Drawing Sheets

(56) References Cited

U.S. PATENT DOCUMENTS

| | | | |
|---|---|---|---|
| 2005/0247809 A1* | 11/2005 | Terauchi | A01K 89/017 242/250 |
| 2014/0183292 A1* | 7/2014 | Kaneko | A01K 89/0108 242/234 |
| 2016/0345558 A1* | 12/2016 | Niitsuma | A01K 89/0155 |
| 2016/0345559 A1* | 12/2016 | Ikuta | A01K 89/0187 |

* cited by examiner

US 9,901,084 B2

DUAL-BEARING REEL

CROSS-REFERENCE TO RELATED APPLICATIONS

This application claims priority based on Japanese Patent Application No. 2016-036391, filed in the Japan Patent Office on Feb. 26, 2016, the contents of each of which are hereby incorporated herein by reference.

BACKGROUND

Field of the Invention

The present invention relates to a dual-bearing reel.

Background Information

In general, a dual-bearing reel includes a casting control mechanism. A casting control mechanism is a mechanism for braking rotation of a spool shaft by applying a frictional force to the spool shaft. Accordingly, the rotational speed of the spool shaft can be suppressed during casting to prevent backlash. In addition, a casting control mechanism is also used when dropping tackle when fishing from a boat, or the like, to adjust the falling speed of the tackle in the water. In the dual-bearing reel disclosed in Japanese Laid-Open Patent Publication No. 1997-275861, an operating lever is pivotably attached to a reel body to facilitate the operation of a casting control mechanism. The braking force with respect to the spool shaft can be adjusted by pivoting the operating lever to thereby adjust the falling speed of the tackle.

SUMMARY

When adjusting an appropriate braking force using an operating lever in the casting control mechanism described above, there are cases in which the operating lever extends in a direction that is difficult for an angler to operate. For example, if the operating lever extends in a direction toward the fishing rod mounting side, there is the problem that the operating lever becomes difficult for the angler to operate. In addition, problems can occur in which the fishing line is caught by the operating lever and becomes tangled.

The object of the present invention is to provide a dual-bearing reel that improves the operability of the operating lever, comprising an operating lever that is capable of reducing the occurrence of tangling.

The dual-bearing reel according to a first aspect of the present invention comprises a reel body, a spool, a spool shaft, a one-way clutch, and an operating lever. The spool is rotatable relative to the reel body. The spool shaft is integrally rotated with the spool. The one-way clutch comprises an outer ring and a rolling body. The outer ring is rotatable relative to the reel body. The rolling body transmits rotation of the spool shaft in the line delivering direction to the outer ring. The one-way clutch is attached to the spool shaft. The operating lever is attached to the reel body. The operating lever extends in a radial direction and has a flat shape. The operating lever is configured to adjust the braking force that brakes the rotation of the outer ring.

According to this configuration, if the spool shaft is rotated in the casting direction, the rotation of the spool shaft is transmitted to the outer ring via the rolling body. That is, the spool shaft and the outer ring are rotated in conjunction. Since the outer ring is braked by the operating lever, the spool shaft is also braked thereby. As a result, the rotational speed of the spool shaft is suppressed at the time of casting to prevent backlash. On the other hand, if the spool shaft is rotated in the line winding (reeling) direction, the rotation of the spool shaft is not transmitted to the outer ring. That is, since the spool shaft and the outer ring are not rotated in conjunction, the spool shaft is not braked. Accordingly, it is possible to suppress the generation of rotational resistance in the spool shaft at the time of line winding, and the spool shaft can be rotated smoothly.

Further, the operating lever for adjusting the braking force with respect to the outer ring extends in the radial direction. Accordingly, it is possible to operate the operating lever while palming. In addition, since the operating lever has a flat shape, the operability of the operating lever is increased, and the fishing line is not easily tangled.

Preferably, the operating lever comprises a first extending portion, a second extending portion, and a connecting portion. The first and the second extending portions extend in the radial direction. Further, the first and the second extending portions are arranged spaced apart from one another in a width direction. The connecting portion extends in the width direction so as to couple the distal end portions of the first and the second extending portions to each other.

The dual-bearing reel according to a second aspect of the present invention comprises a reel body, a spool, a spool shaft, a one-way clutch, and an operating lever. The spool is rotatable relative to the reel body. The spool shaft is integrally rotated with the spool. The one-way clutch comprises an outer ring and a rolling body. The outer ring is rotatable relative to the reel body. The rolling body transmits the rotation of the spool shaft in the casting direction to the outer ring. The one-way clutch is attached to the spool shaft. The operating lever is attached to the reel body. The operating lever is configured to adjust the braking force that brakes the rotation of the outer ring. The operating lever comprises a first extending, portion, a second extending portion, and a connecting portion. The first and the second extending portions extend in the radial direction. The first and the second extending portions are arranged spaced apart from one another in the width direction. The connecting portion extends in the width direction so as to couple the distal end portions of the first and the second extending portions to each other.

According to this configuration, for the same reason as described above, the rotational speed of the spool shaft is suppressed at the time of casting to prevent backlash. In addition, it is possible to suppress the generation of rotational resistance in the spool shaft at the time of line winding, and the spool shaft can be rotated smoothly.

Further, the operating lever for adjusting the braking force with respect to the outer ring extends in the radial direction. Accordingly, it is possible to operate the operating lever while palming. In addition, since the operating lever comprises first and second extending portions that are arranged spaced apart in the width direction, the operability of the operating lever is increased, and the fishing line is not easily tangled.

Preferably, the radially outer end of the operating lever is recessed toward the reel body side. According to this configuration, the operating lever can be operated by placing a finger on the recessed portion of the operating lever.

Preferably, the radial outer edge of the operating lever is recessed radially inwardly. According to this configuration, the operating lever can be operated by placing a finger on the recessed portion of the operating lever.

Preferably, the corners of the distal end of the operating lever are chamfered. According to this configuration, even if the fishing line is caught on the operating lever, the fishing line can be smoothly disengaged from the operating lever.

Preferably, the distal end portion of the operating lever is disposed on the reel body side, with respect to the proximal end portion of the operating lever. According to this configuration, even if the fishing line is caught on the operating lever, the fishing line can be smoothly disengaged from the operating lever.

Preferably, the operating lever has an opening. According to this configuration, the operating lever can be reduced in weight.

The operating lever has a recess that is recessed on the reel body side. According to this configuration, the operating lever can be operated by placing a finger on the recess.

Preferably, the end portion of the operating lever on the radial outer side has a smaller width than the end portion on the radial inner side. According to this configuration, even if the fishing line is caught on the operating lever, the fishing line can be smoothly disengaged from the operating lever.

Preferably, the operating lever comprises a cylindrical portion and a lever portion. The cylindrical portion is threaded onto the reel body, and is capable of moving in the axial direction by rotation. The lever portion extends from the cylindrical portion in the radial direction.

Preferably, one edge of the lever portion in the width direction extends from a contact point with the cylindrical portion. According to this configuration, there is no step between the cylindrical portion and the lever portion, and the fishing line is less likely to be caught on the lever portion.

Preferably, the lever portion has a width the same as the diameter of the cylindrical portion.

Preferably, the operating lever is pivotably attached to the reel body. Then, the braking force is adjusted by pivoting the operating lever.

Preferably, the operating lever is threaded onto the reel body and presses the outer ring in the axial direction.

According to the present invention, the operability of the operating lever is improved and the occurrence of tangling is reduced.

BRIEF DESCRIPTION OF THE DRAWINGS

Referring now to the attached drawings which form a part of this original disclosure.

DETAILED DESCRIPTION OF THE EMBODIMENTS

Embodiments of the dual-bearing reel according to the present invention will be described below, with reference to the drawings. The axial direction means the direction in which the spool shaft extends. Further, the radial direction means the radial direction of a circle having the spool shaft as the center, and the circumferential direction means the circumferential direction of the circle having the spool shaft as the center. In addition, the width direction means the width direction of the operation reel.

Dual-Bearing Reel

Figure 1:
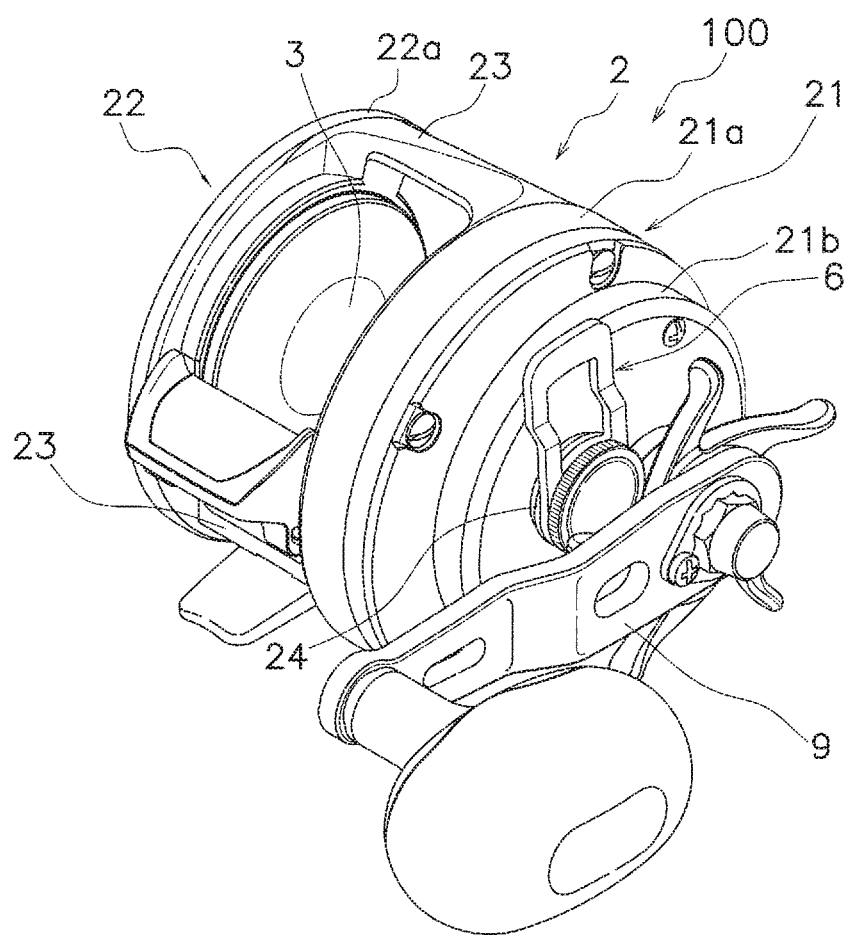
FIG. 1 is a perspective view of a dual bearing reel.
Figure 2:
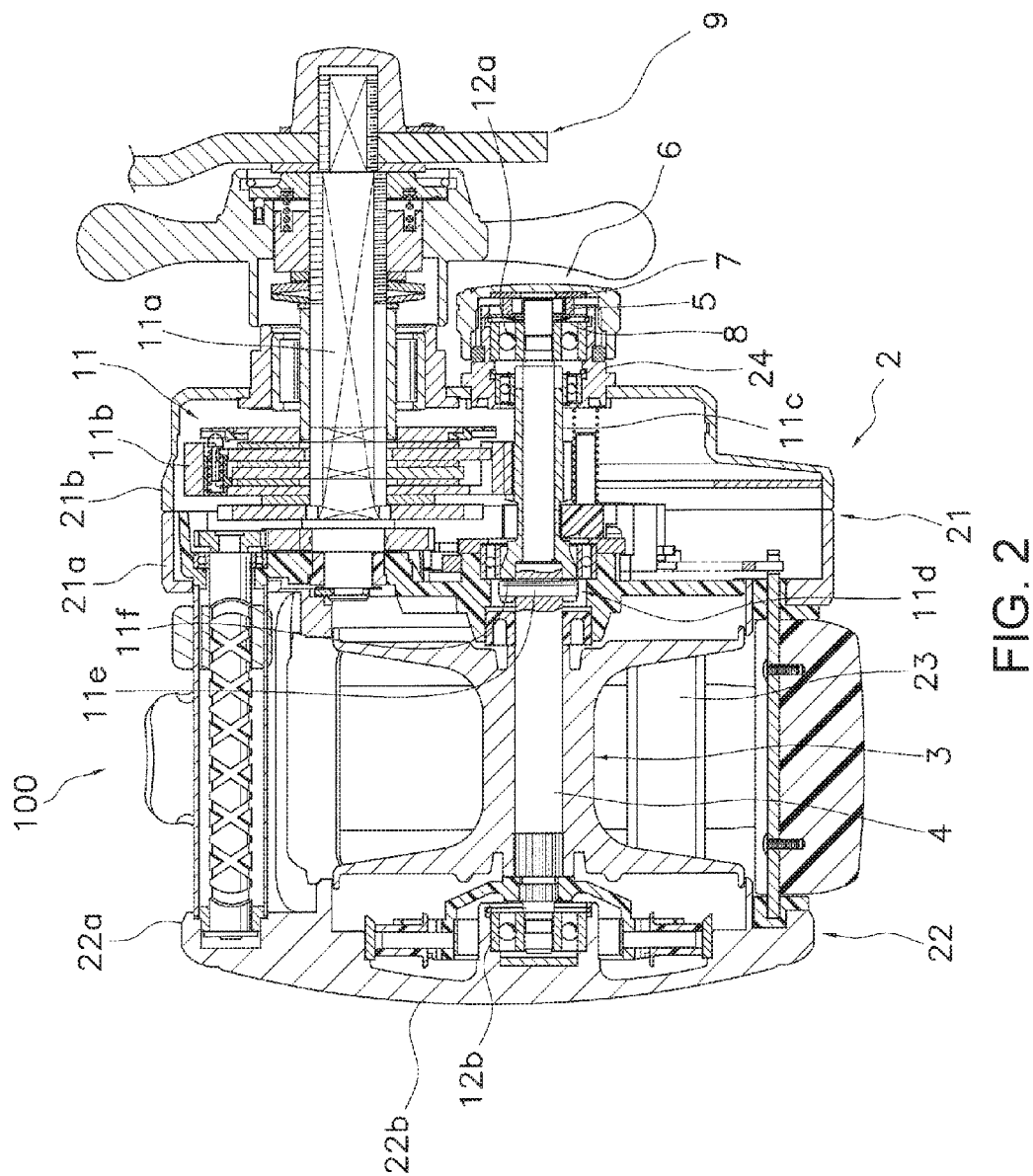
FIG. 2 is a cross-sectional view of the dual bearing reel.

As shown in FIG. 1 and FIG. 2, the dual-bearing reel 100 comprises a reel body 2, a spool 3, a spool shaft 4, a one-way clutch 5, and an operating lever 6. The dual-bearing reel 100 further comprises a first friction plate 7, a biasing member 8 and a handle 9.

Reel Body

The reel body 2 comprises a first reel body portion 21 and a second reel body portion 22. The first reel body portion 21 and the second reel body portion 22 are disposed at an interval from each other in the axial direction. The first reel body portion 21 and the second reel body portion 22 are coupled to each other via a plurality of connecting portions 23.

The first reel body portion 21 comprises a first side plate 21a and a first side cover 21b. The first reel body portion 21 comprises a housing space inside. A rotation transmission mechanism 11 and the like are housed in this housing space. The second reel body portion 22 comprises a second side plate 22a and a second side cover 22b. The first side plate 21a and the second side plate 22a are coupled to each other via the connecting portion 23. The first side plate 21a, the second side plate 22a, and the connecting portion 23 are integrally formed, and form a frame of the reel body 2.

Figure 3:
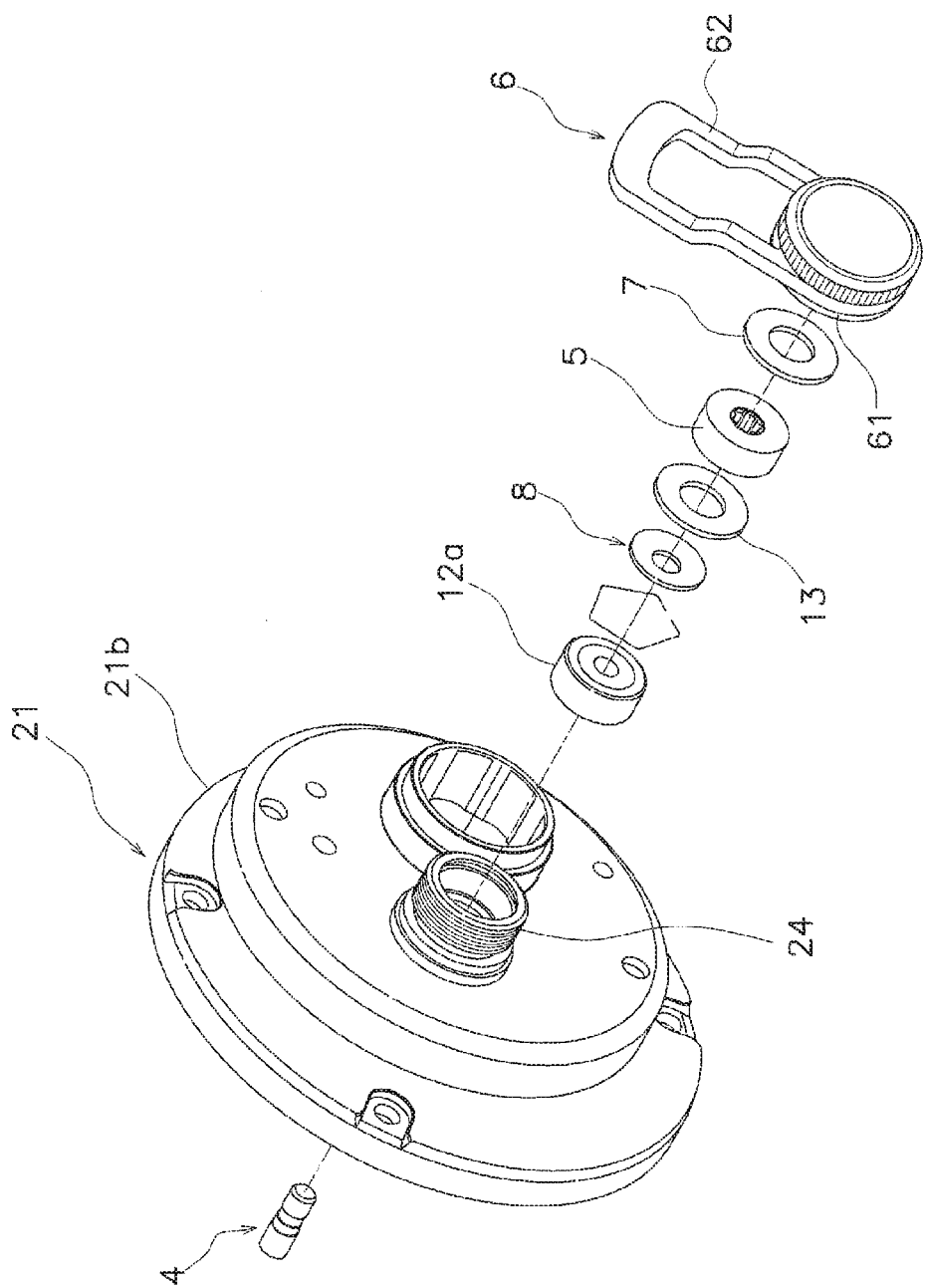
FIG. 3 is an exploded perspective view of the dual-bearing reel.

As shown in FIG. 3, the first reel body portion 21 further comprises a protrusion 24. The protrusion 24 has a cylindrical shape and protrudes axially outward. In particular, the protrusion 24 protrudes axially outward from the first cover 211. The operating lever 6 is attached to this protrusion 24. Specifically, a threaded portion is formed on the outer perimeter surface of the protrusion 24. Then, the operating lever 6 is threaded onto the protrusion 24. The protrusion 24 links the housing space of the first reel body portion 21 with the outside. One of the ends of the spool shaft 4 is rotatably supported in the protrusion 24.

Spool

As shown in FIG. 2, the spool 3 is disposed between the first reel body portion 21 and the second reel body portion 22. In particular, the spool 3 extends in the axial direction having a substantially cylindrical shape. The spool 3 is rotatable relative to the reel body 2. The spool 3 is rotatably supported on the reel body 2 via the spool shaft 4.

Spool Shaft

The spool shaft 4 is integrally rotated with the spool 3. The spool shaft 4 is rotatably supported by the first reel body portion 21 and the second reel body portion 22. The spool shaft 4 is rotatably supported on the first reel body portion 21 and the second reel body portion 22 via first and second axle bearing members 12a and 12b.

One-Way Clutch

Figure 4:
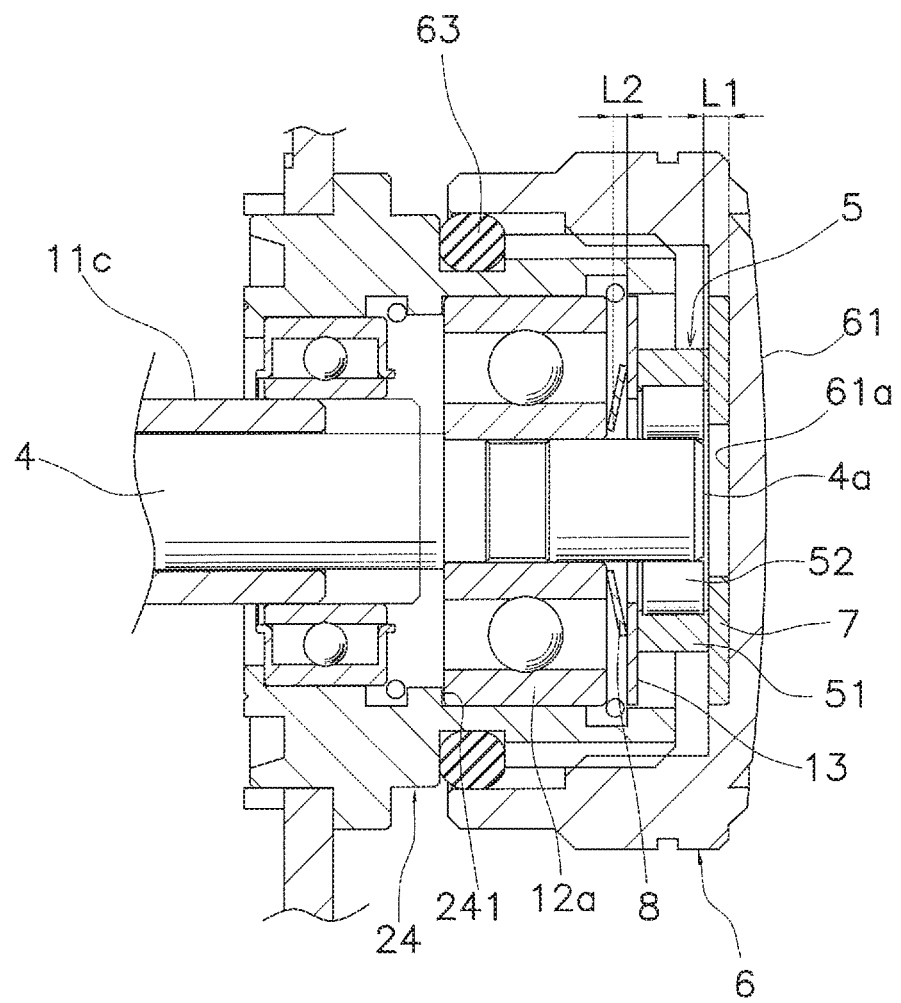
FIG. 4 is an enlarged cross-sectional view of the dual-bearing reel.

As shown in FIG. 4, the one-way clutch 5 is attached to the spool shaft 4. The one-way clutch 5 comprises an outer ring 51 and a plurality of rolling bodies 52. The outer ring 51 is rotatable relative to the reel body 2. In particular, the outer ring 51 is rotatable relative to the protrusion 24. The outer ring 51 is disposed with a gap between the inner perimeter surface of the protrusion 24.

The outer ring 51 is sandwiched between a first friction plate 7 and a second friction plate 13 in the axial direction.

That is, the rotation of the outer ring 51 is braked by the first and second friction plates 7 and 13.

The rolling bodies 52 are disposed between the spool shaft 4 and the outer ring 51. The rolling bodies 52 transmit the rotation of the spool shaft 4 in the line delivering direction to the outer ring 51. On the other hand, the rolling bodies 52 do not transmit the rotation of the spool shaft 4 to the outer ring 51 in the line winding direction.

Operating Lever

As shown in FIG. 3, the operating lever 6 is attached to the reel body 2. The operating lever 6 has a flat shape and extends in the radial direction. Both corners of the distal end of the operating lever 6 are chamfered. The two corners of the distal end of the operating lever 6 may be R-chamfered, or be C-chamfered.

The operating lever 6 is threaded onto the protrusion 24 of the reel body 2. Accordingly, the operating lever 6 is pivotable relative to the reel body 2. When the operating lever 6 is pivoted, the operating lever 6 is moved in the axial direction.

The operating lever 6 is capable of adjusting the braking force that brakes the rotation of the outer ring 51. In particular, the force that presses the outer ring 51 can be adjusted, and the braking force with respect to the outer ring 51 can be adjusted by pivoting and moving the operating lever 6 in the axial direction.

Figure 5:
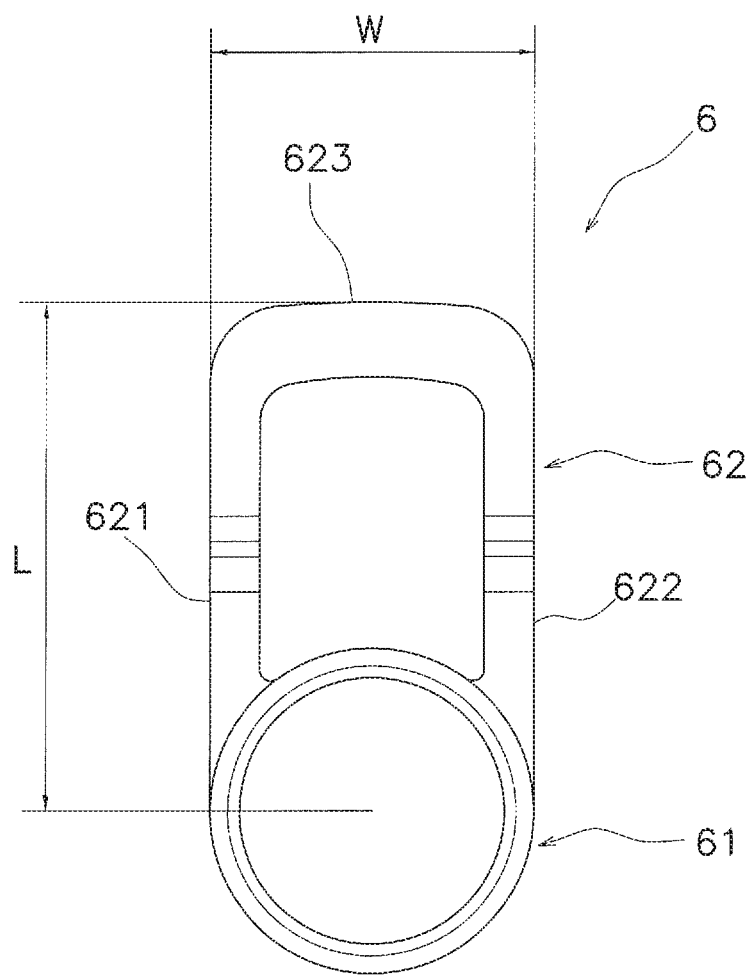
FIG. 5 is a front view of the operating lever.

As shown in FIG. 5, the operating lever 6 comprises a cylindrical portion 61 and a lever portion 62. The length L of the operating lever 6 is, for example, about 20-40 mm. The length L ref the operating lever 6 is the length from the rotational axis of the spool shaft 4 in the radial direction. Further, the length direction of the operating lever 6 extends substantially parallel to the radial direction, and the width direction of the operating lever 6 is substantially perpendicular to the length direction of the operating lever 6.

A threaded portion is formed on the inner perimeter surface of the cylindrical portion 61. The cylindrical portion 61 is threaded onto the protrusion 24. Accordingly, the cylindrical portion 61 is capable of moving in the axial direction by rotation. The outer diameter of the cylindrical portion 61 is, for example, about 15-25 mm.

The lever portion 62 extends from the cylindrical portion 61 in the radial direction. The width W of the lever portion 62 is, for example, about 15-25 mm. In the present embodiment, the width W of the lever portion 62 is substantially the same as the diameter of the cylindrical portion 61. That is, both edges of the lever portion 62 in the width direction extend from the contact point with the cylindrical portion 61 in the radial direction. Accordingly, when viewed from the axial direction, a step is not formed between the lever portion 62 and the cylindrical portion 61.

The lever portion 62 comprises a first extending portion 621, a second extending portion 622, and a connecting portion 623. The first extending portion 621 and the second extending portion 622 are arranged spaced apart from one another in the width direction. Further, the first extending portion 621 and the second extending portion 622 extend in the radial direction.

Figure 6:
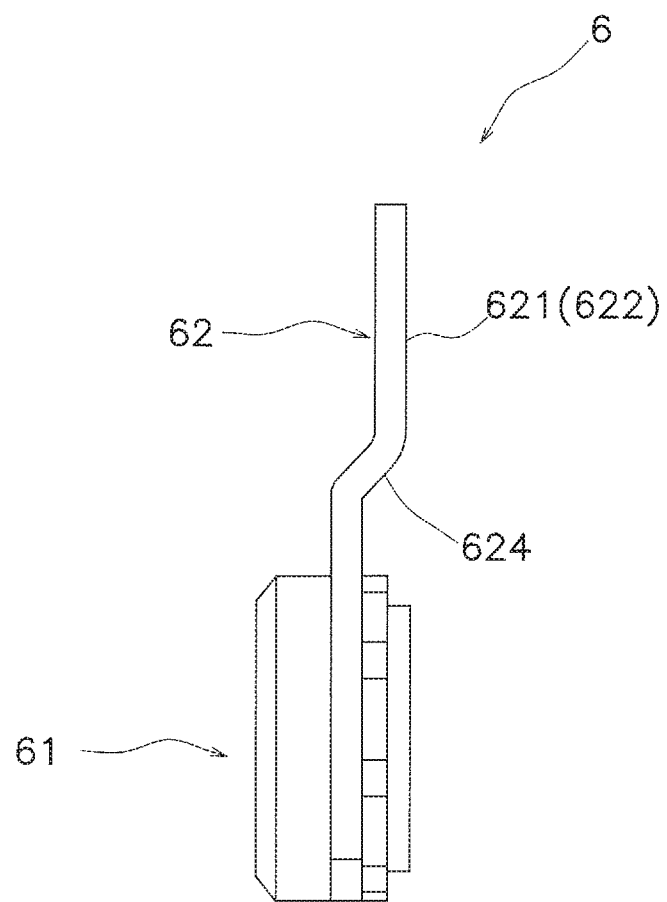
FIG. 6 is a side view of the operating lever.

The first extending portion 621 and the second extending portion 622 have a shape that conforms to the shape of the reel body 2. In particular, as shown in FIG. 6, the first extending portion 621 and the second extending portion 622 each comprise a stepped portion 624 in the radially center portions thereof. Accordingly, the distal end portions of the first extending portion 621 and the second extending portion 622 are arranged toward the reel body 2 side with respect to the proximal end portion. Meanwhile, the proximal end portions of the first extending portion 621 and the second extending portion 622 are ends on the cylindrical portion.

As shown in FIG. 5, the connecting portion 623 couples the distal end portion of the first extending portion 621 and the distal end portion of the second extending portion 622. The connecting portion 623 extends in the width direction. The connecting portion 623 is integrally formed with the first extending portion 621 and the second extending portion 622.

As shown in FIG. 4, a seal member 63 is disposed between the inner perimeter surface of the cylindrical portion 61 and the outer perimeter surface of the protrusion 24. The seal member 63 can prevent the intrusion of foreign objects into the reel body 2. Further, rotational resistance is imparted to the operating lever 6 by seal member 63 so that the operating lever 6 will not be rotated against the intention of the angler.

A first friction plate 7 is disposed between the outer ring 51 of the one-way clutch 5 and the operating lever 6. The first friction plate 7 is an annular plate and is in contact with the outer ring 51. The first friction plate 7 is also in contact with the outer ring 51, but not in contact with the rolling bodies 52. The first friction plate 7 is, for example, made of carbon cloth. The operating lever 6 presses the outer ring 51 in the axial direction via the first friction plate 7.

Biasing Member

The biasing member biases the outer ring 51 of the one-way clutch 5 toward the operating lever 6. That is, the biasing member 8 biases the outer ring 51 so that the outer ring 51 does not separate from the first friction plate 7. Meanwhile, the biasing member 8 biases the outer ring 51 via a second friction plate 13. The second friction plate 13 has an annular shape and is in contact with the outer ring 51 of the one-way clutch 5. Meanwhile, the second friction plate 13 is not in contact with the rolling bodies 52.

The axial movement of the biasing member 8 in a direction away from the one-way clutch 5 is restricted. Specifically, the biasing member 8 is supported by the first axle bearing member 12a. The movement of this first axle bearing member 12a in a direction away from the one-way clutch 5 is restricted by a stepped portion 241 formed on the inner perimeter surface of the protrusion 24.

The biasing member 8 is, for example, a disc spring. The outer perimeter part of the biasing member 8 biases the outer ring 51 of the one-way clutch 5 via the second friction plate 13. Further, the inner perimeter part of the biasing member 8 is supported by the inner ring of the first axle bearing member 12a.

The distance L1 between one end surface 4a of the spool shaft 4 and a bottom surface 61a of the cylindrical portion 61 of the operating lever 6 in the axial direction is greater than the expansion amount L2 of the biasing member 8 between an uncompressed state and a maximum compression state (L1>L2). Accordingly, even if the biasing member 8 is completely compressed, the end surface 4a of the spool shaft 4 does not contact the bottom surface 61a of the cylindrical portion 61.

Handle

As shown in FIG. 2, the handle 9, a member for rotating the spool shaft 4, is rotatably mounted to the first reel body portion 21. When the handle 9 is rotated, the spool shaft 4 is rotated via a rotation transmission mechanism 11.

Rotation Transmission Mechanism

The rotation transmission mechanism 11 is a mechanism for transmitting the rotation of the handle 9 to the spool shaft 4. The rotation transmission mechanism 11 comprises a drive shaft 11a, a drive gear 11b, a pinion gear 11c, and a clutch mechanism 11d. The drive shaft 11a is integrally rotated with the handle 9. The drive gear 11b is integrally rotated with the drive shaft 11a. The pinion gear 11c meshes with the drive gear 11b. The pinion gear 11c has a tubular shape and the spool shaft 4 extends through the interior of the pinion gear 11c.

The clutch mechanism d transmits or cuts off the rotation of the pinion gear 11c to the spool shaft 4. Specifically, the clutch mechanism 11d is formed from an engagement pin 11e and an engagement recess 11f. The engagement pin 11e extends through the spool shaft 4 in the radial direction. The engagement recess 11f is a recess formed at one end of the pinion gear 11c. The rotation of the pinion gear 11c is transmitted to the spool shaft 4 by the engagement pin 11e being engaged with the engagement recess 11f. On the other hand, when the engagement between the engagement pin 11e and the engagement recess 11f is released by the pinion gear 11c being moved in a direction away from the engagement pin 11e, the rotation of the pinion gear 11c is not transmitted to the spool shaft 4.

Operation

Next, the operation of the dual-bearing reel 100 will be described. At the time of casting, in which a fishing line is unreeled from the spool 3, the spool shaft 4 is rotated in the casting direction. The rotation of this spool shaft 4 in the casting direction is transmitted to the outer ring 51 via the rotating bodies 52 of the one-way clutch 5, thereby rotating the outer ring 51. The outer ring 51 is pressed by the operating lever 6 via the first friction plate 7. That is, since the outer ring 51 is braked by the operating lever 6, the rotational speed of the outer ring 51 is suppressed. Since the outer ring 51 and the spool shaft 4 are interlocked, the rotational speed of the spool shaft 4 at the time of line delivering is also suppressed and backlash is prevented.

Further, when the operating lever 6 is pivoted, the operating lever 6 is moved in the axial direction; therefore, the pressing force of the operating lever 6 with respect to the outer ring 51 can be adjusted. That is, the braking force with respect to the spool shaft 4 can be adjusted by pivoting the operating lever 6.

On the other hand, when winding the fishing line, the spool shaft 4 is rotated in the line winding direction. The rolling bodies 52 do not transmit rotation of the spool shaft 4 in the line winding, direction to the outer ring 51. That is, the spool shaft 4 and the outer ring 51 will not be interlocked, and the braking force by the operating lever 6 will not act on the spool shaft 4. Therefore, the rotational resistance by the operating lever 6 will not be generated in the spool shaft 4 at the time of line winding, and the spool shaft 4 can be smoothly rotated.

Modified Example

One embodiment of the present invention is described above, but the present invention is not limited to the above-described embodiment, and various modifications can be made without departing from the scope of the invention.

Figure 7:
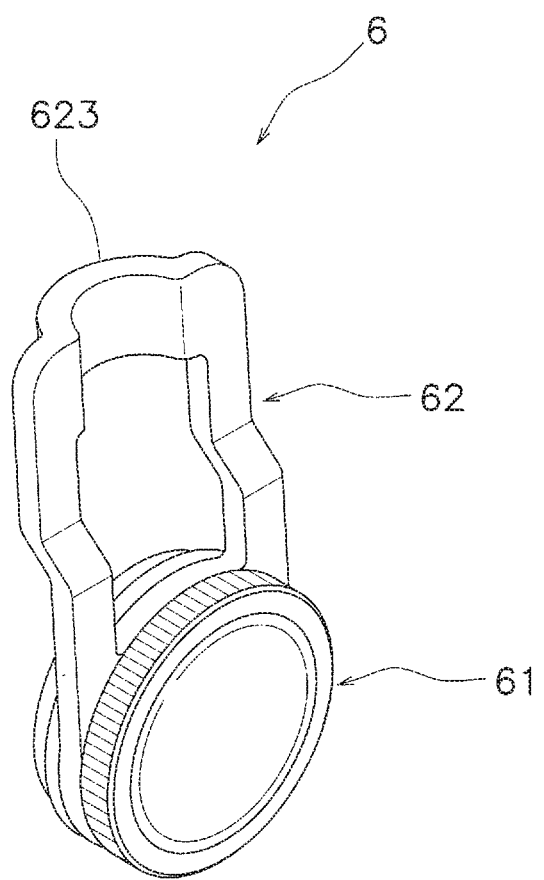
FIG. 7 is a perspective view of the operating lever according to a modified example.

For example, as shown in FIG. 7, the connecting portion 623 of the operating lever 6 may be recessed toward the reel body 2 side. With such a shape, the thumb will fit the connecting portion 623, improving the operability of the operating lever 6 as a result.

Figure 8:
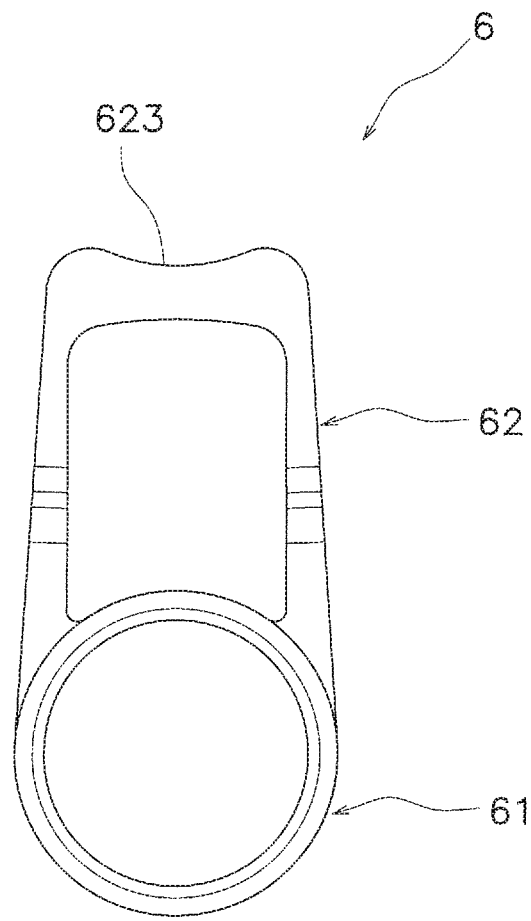
FIG. 8 is a front view of the operating lever according to a modified example.

Further, as shown in FIG. 8, the radial outer edge of the connecting portion 623 of the operating lever 6 may be recessed toward the radial inner side.

Figure 9:
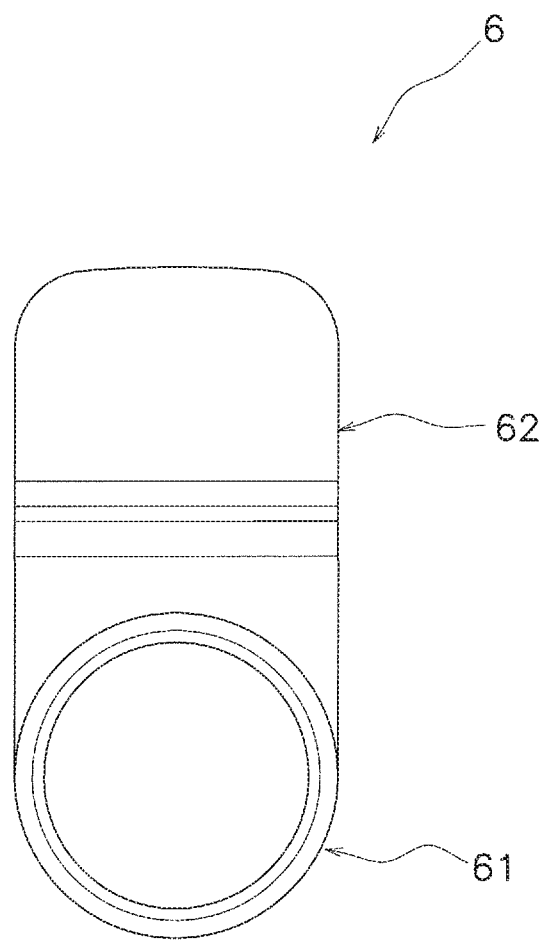
FIG. 9 is a front view of the operating lever according to a modified example.
Figure 10:
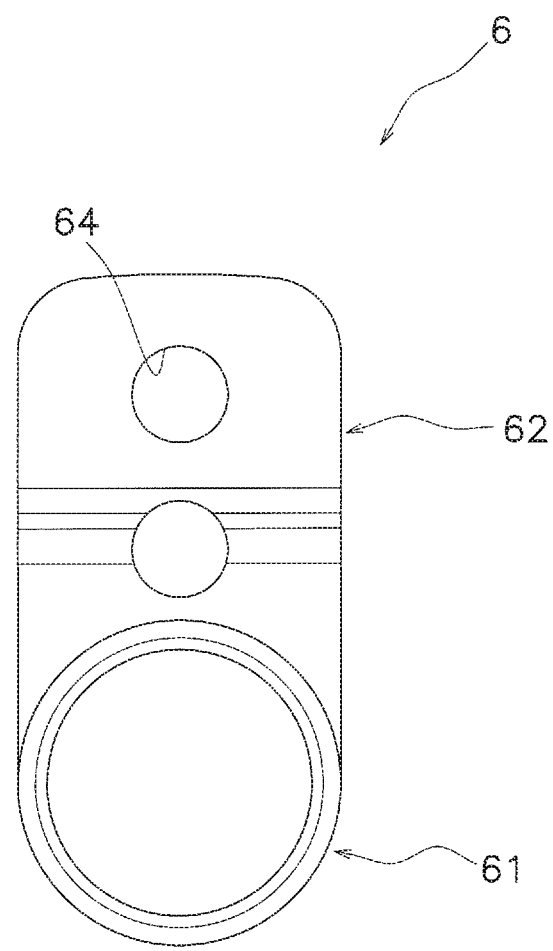
FIG. 10 is a front view of the operating lever according to a modified example.

In addition, in the above-described embodiment, the lever portion 62 comprises a first extending portion 621, a second extending portion 622, and a connecting portion 623; however, the configuration of the lever portion 62 is not limited thereto. For example, as shown in FIG. 9, the lever portion 62 may be formed of a single flat plate member. In this embodiment, from the point of view of weight reduction, at least one opening 64 may be formed in the center of the lever portion 62, as shown in FIG. 10. Further, the lever portion 62 may comprise a recess that is recessed toward the reel body 2 side instead of the opening 64.

Figure 11:
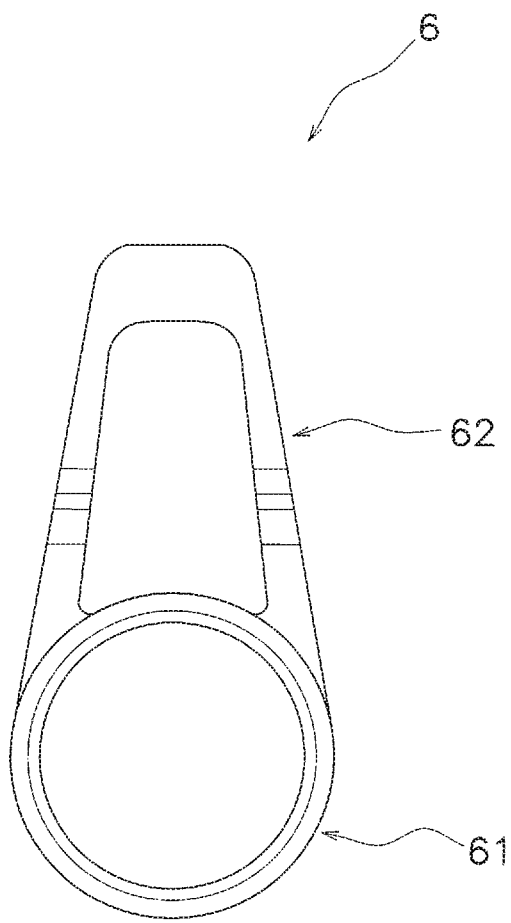
FIG. 11 is a front view of the operating lever according to a modified example.

In addition, as shown in FIG. 11 the lever portion 62 may be such that the end portion on the radial outer side has a smaller width than the end portion on the radial inner side. Specifically, the lever portion 62 may have a shape that is tapered in the width direction.

Figure 12:
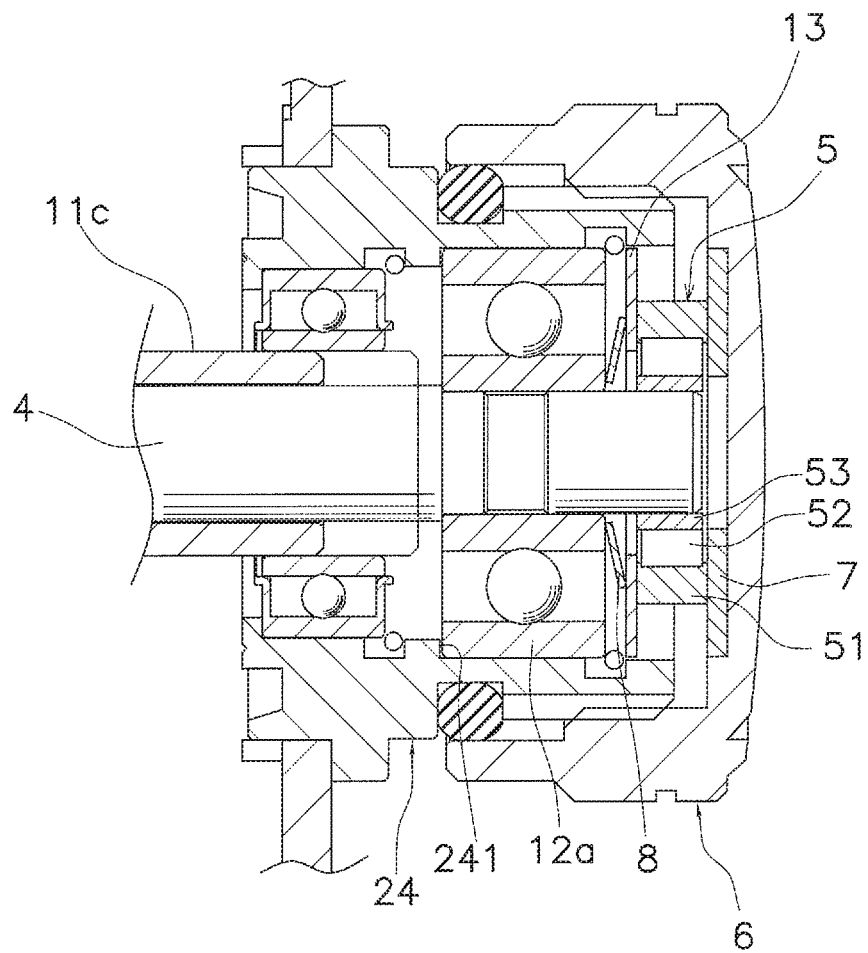
FIG. 12 is an enlarged cross-sectional view of a dual-bearing reel according to a modified example.

Further, as shown in FIG. 12, the one-way clutch 5 may further comprise an inner ring 53. The inner ring 53 is attached to the spool shaft 4. The rolling bodies 52 are disposed between the outer ring 51 and the inner ring 53.

In the embodiment described above, the biasing member 8 is supported in the axial direction by the first axle bearing member 12a, but no limitation is imposed thereby. For example, the biasing member 8 may be supported by a stepped portion formed on the inner perimeter surface of the protrusion 24.

In the embodiment described above, the one-way clutch 5 is disposed in the first reel body portion 21, but the one-way clutch 5 may be disposed in the second reel body portion 22 as well. In this embodiment, the operating lever 6 is also pivotably attached to the second reel body portion 22. Meanwhile, the operating lever 6 may be disposed on the second reel body portion 22 as well. In this embodiment, a portion of the operating lever 6 is exposed from the outer perimeter surface of the second reel body portion 22.

What is claimed is:

1. A dual-bearing reel, comprising:
    a reel body;
    a spool rotatable relative to the reel body;
    a spool shaft integrally rotatable with the spool;
    a one-way clutch comprising an outer ring rotatable relative to the reel body and a rolling body configured to transmit rotation of the spool shaft in a casting direction to the outer ring, and attached to the spool shaft; and
    an operating lever having a flat shape, attached to the reel body, and extending in a radial direction, the operating lever being configured to adjust a braking force that brakes the rotation of the outer ring.

2. The dual-bearing reel recited in claim 1, wherein
    the operating lever comprises
    first and second extending portions extending in the radial direction and arranged spaced apart from one another in a width direction, and
    a connecting portion extending in the width direction so as to couple distal end portions of the first and second extending portions to each other.

3. The dual-bearing reel recited in claim 1, wherein
    a radial outer end of the operating lever is recessed toward a reel body side.

4. The dual-bearing reel recited in claim 1, wherein
    a radial outer edge of the operating lever is recessed radially inward.

5. The dual-bearing reel recited in claim 1, wherein
    corners of a distal end side of the operating lever are chamfered.

6. The dual-hearing reel recited in claim 1, wherein
a distal end portion of the operating lever is disposed on a reel body side with respect to a proximal end portion of the operating lever.

7. The dual-bearing reel recited in claim 1, wherein
the operating lever comprises an opening.

8. The dual-bearing reel recited in claim 1, wherein
the operating lever comprises a recess on a reel body side.

9. The dual-bearing reel recited in claim 1, wherein
an end portion of the operating lever on a radial outer side has a smaller width than an end portion on a radial inner side.

10. The dual-hearing reel recited in claim 1, wherein
the operating lever comprises
a cylindrical portion threaded onto the reel body, and movable in an axial direction by rotation, and
a lever portion extending from the cylindrical portion in a radial direction.

11. The dual-bearing reel recited in claim 10, wherein
one edge of the lever portion in a width direction extends from a contact point with the cylindrical portion.

12. The dual-bearing reel recited in claim 10, wherein
the lever portion has a width equal to a diameter of the cylindrical portion.

13. The dual-bearing reel recited in claim 1, wherein
the operating lever is pivotably attached to the reel body, and is configured to adjust the braking force by pivoting.

14. The dual-bearing reel recited in claim 1, wherein
the operating lever is configured to be threaded onto the reel body and press the outer ring in an axial direction.

15. A dual-bearing reel, comprising:
a reel body;
a spool rotatable relative to the reel body;
a spool shaft integrally rotatable with the spool;
a one-way clutch comprising an outer ring rotatable relative to the reel body and a rolling body configured to transmit rotation of the spool shaft to the outer ring in a casting direction, and attached to the spool shaft; and
an operating lever attached to the reel body, the operating lever being configured to adjust a braking force that brakes the rotation of the outer ring, wherein
the operating lever comprising
first and second extending portions extending in a radial direction and arranged spaced apart from one another in a width direction, and
a connecting portion extending in the width direction so as to couple distal end portions of the first and second extending portions to each other.

\* \* \* \* \*